(12) United States Patent
Murakami

(10) Patent No.: US 8,439,278 B2
(45) Date of Patent: May 14, 2013

(54) APPARATUS FOR PRODUCING A MASS OF WATER VAPOR, APPARATUS FOR PRODUCING, MOVING AND CLIMBING A MASS OF WATER VAPOR, AND METHOD OF CAUSING ARTIFICIAL STIMULATION OF RAIN

(76) Inventor: Hideyo Murakami, Fukuoka (JP)

( * ) Notice: Subject to any disclaimer, the term of this patent is extended or adjusted under 35 U.S.C. 154(b) by 427 days.

(21) Appl. No.: 12/734,647

(22) PCT Filed: Mar. 11, 2009

(86) PCT No.: PCT/JP2009/001096
§ 371 (c)(1),
(2), (4) Date: May 13, 2010

(87) PCT Pub. No.: WO2009/116251
PCT Pub. Date: Sep. 24, 2009

(65) Prior Publication Data
US 2010/0308124 A1    Dec. 9, 2010

(30) Foreign Application Priority Data

Mar. 19, 2008  (JP) ................................ 2008-071406
Jun. 17, 2008  (JP) ................................ 2008-158395

(51) Int. Cl.
*A01G 15/00* (2006.01)
(52) U.S. Cl.
USPC .............................. 239/2.1; 239/14.1; 405/52
(58) Field of Classification Search .................. 239/2.1, 239/14.1; 159/1.1, 5, 47.1; 405/52, 63–72, 405/212; 114/219, 230.15, 230.17; 126/565
See application file for complete search history.

(56) References Cited

U.S. PATENT DOCUMENTS

| | | | | |
|---|---|---|---|---|
| 3,409,220 A * | 11/1968 | Black | ............................ | 239/2.1 |
| 3,568,925 A * | 3/1971 | Lietzer | ........................... | 239/2.1 |
| 3,601,312 A * | 8/1971 | Feather | .......................... | 239/2.1 |
| 3,666,176 A * | 5/1972 | Carter, Jr. | ..................... | 239/2.1 |
| 4,092,827 A * | 6/1978 | Schneider | ....................... | 60/398 |

(Continued)

FOREIGN PATENT DOCUMENTS

JP       57-150328       9/1982
JP       57-186422      11/1982

(Continued)

OTHER PUBLICATIONS

International Search Report issued Apr. 28, 2009 in International (PCT) Application No. PCT/JP2009/001096.

*Primary Examiner* — Darren W Gorman
(74) *Attorney, Agent, or Firm* — Wenderoth, Lind & Ponack, L.L.P.

(57) ABSTRACT

An apparatus for producing a mass of water vapor includes a water film maker and a device which prevents the water film maker from drifting. The water film maker floats on a surface of a water source and absorbs water of the water source by virtue of a capillary mechanism or a moisture-holding ability to make a thin water film on a surface of the water film maker. The thin water film is exposed to sunlight. The water film maker comprises a first hollow body capable of being filled with air, and a sheet having said capillary mechanism or having said moisture-holding ability, said sheet covering said first hollow body. Water in the thin water film is vaporized by sunlight energy to thereby produce a mass of water vapor in the sky.

19 Claims, 15 Drawing Sheets

U.S. PATENT DOCUMENTS

| | | | | |
|---|---|---|---|---|
| 4,537,528 A | * | 8/1985 | Simpson | 405/72 |
| 4,645,376 A | * | 2/1987 | Simpson | 405/63 |
| 5,085,538 A | * | 2/1992 | Campbell | 405/66 |
| 5,374,133 A | * | 12/1994 | Lazes et al. | 405/68 |
| 5,385,427 A | * | 1/1995 | Kateley et al. | 405/68 |
| 5,480,261 A | * | 1/1996 | Meyers et al. | 405/63 |
| 5,871,305 A | * | 2/1999 | Allen | 405/70 |
| 6,695,535 B1 | * | 2/2004 | Lazes | 405/63 |
| 2004/0172944 A1 | * | 9/2004 | Newman | 60/639 |
| 2005/0006491 A1 | * | 1/2005 | Lin | 239/2.1 |

FOREIGN PATENT DOCUMENTS

| | | |
|---|---|---|
| JP | 2003-88257 | 3/2003 |
| JP | 2007-82408 | 4/2007 |
| JP | 4164540 | 8/2008 |

\* cited by examiner

FIG. 2
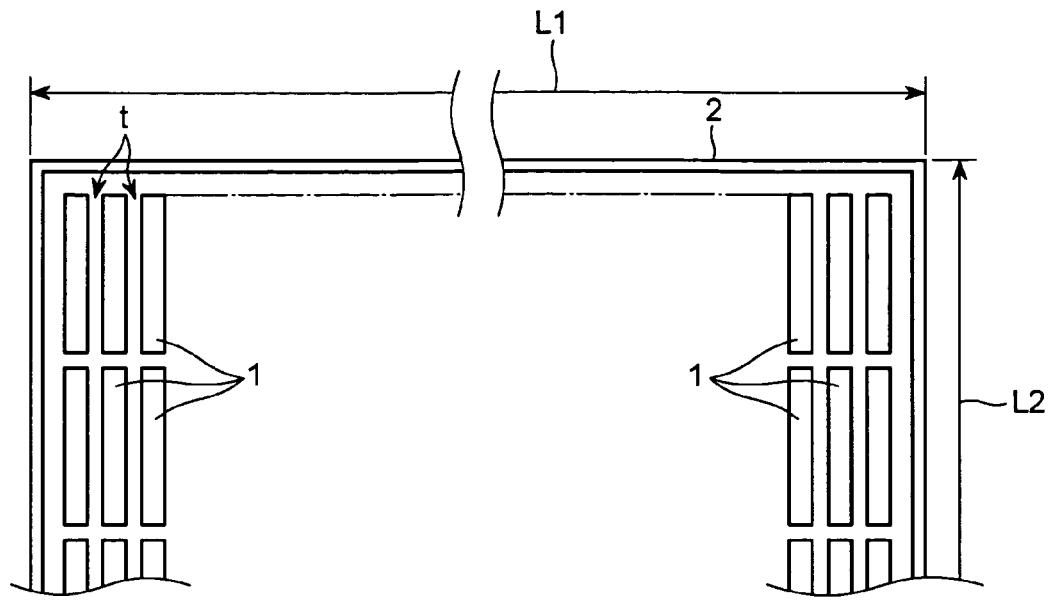
A1
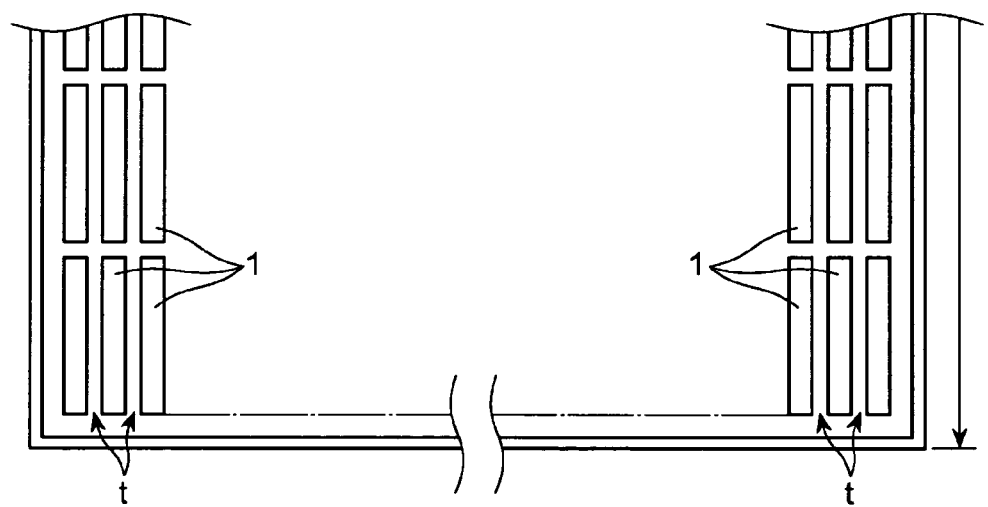

APPARATUS FOR PRODUCING A MASS OF WATER VAPOR, APPARATUS FOR PRODUCING, MOVING AND CLIMBING A MASS OF WATER VAPOR, AND METHOD OF CAUSING ARTIFICIAL STIMULATION OF RAIN

BACKGROUND OF THE INVENTION

1. Field of the Invention

The invention relates to an apparatus for producing a mass of water vapor, which apparatus is used for effectively causing artificial stimulation of rain, an apparatus for producing, moving and climbing a mass of water vapor, and a method of causing artificial stimulation of rain through the use of the apparatus for producing, moving and climbing a mass of water vapor.

2. Description of the Related Art

An attempt has been made for causing artificial stimulation of rain as a countermeasure for drought. In conventional methods of causing artificial stimulation of rain, raindrops were artificially made by dispersing dry ice into naturally produced cloud particles. Thus, it was necessary to wait until cloud particles were naturally produced, and natural production of cloud particles was dependent on a chance, resulting in that it was difficult to cause artificial stimulation of rain in a desired area at a desired time. An example of a technique concerning artificial stimulation of rain is disclosed in Japanese Patent Application Publication No. 2003-88257.

In addition, Japanese Patent Application Publication No. 57 (1982)-150328 discloses a method of producing ascending air current, including the steps of forming a shallow seawater pool, and exposing the seawater to sunlight to thereby vaporize the seawater.

However, it was difficult in the conventional art to control an amount of produced water vapor. Furthermore, after seawater that has been absorbed by virtue of capillary mechanism has evaporated, salt remains sticking to a capillary device with the result of reduction in a function of capillary mechanism. It requires a lot of work to remove such salt.

In order to effectively cause artificial stimulation of rain, it is important and necessary to climb a mass of produced water vapor at a height where winds blow towards an area in which it is intended to rain. In addition, since a height preferable for a mass of water vapor to climb for causing artificial stimulation of rain varies in accordance with circumstances, it is also necessary to control a height at which a mass of water vapor has to climb. Furthermore, winds scarcely blow in some seasons, in which case, it is necessary to cause winds to blow in a desired direction.

However, the conventional art fails to disclose how to move a mass of water vapor in order to cause the water vapor to ride on ascending air current, and how to control a height at which a mass of water vapor has to climb. In addition, it is necessary to cause an apparatus for producing a mass of water vapor to shunt under wild weather conditions such as a typhoon.

SUMMARY OF THE INVENTION

In view of the above-mentioned problems in the conventional art, it is an object of the present invention to provide an apparatus for producing a mass of vapor water by making thin water films and effectively vaporizing moisture contained in the thin water films, an apparatus for producing, moving and climbing a mass of water vapor, which apparatus moves a mass of produced water vapor in a desired direction or climbs a mass of produced water vapor at a desired height, and maintain a function of making water films used for producing a mass of water vapor, and a method of effectively causing artificial stimulation of rain through the use of the apparatus for producing, moving and climbing a mass of water vapor.

In order to solve the above-mentioned problems, the present invention provides an apparatus for producing a mass of water vapor, including a water film maker floating on a surface of a water source, the water film maker absorbing water of the water source by virtue of capillary mechanism or moisture-holding ability to make a thin water film on the surface, the thin water film being to be exposed to sunlight, and a device for preventing a plurality of the water film makers arranged on the surface, from drifting, wherein moisture absorbed in the thin water film is vaporized by sunlight energy to thereby produce a mass of water vapor in the sky.

The thin water film to be made by virtue of capillary mechanism or moisture-holding ability can be readily heated by sunlight energy to a temperature at which water is vaporized, and hence, it is possible to effectively produce a mass of water vapor.

In the present invention, the water film maker may be designed to comprise a floater, and a sheet presenting capillary mechanism or having moisture-holding ability, the floater being covered with the sheet, wherein the sheet absorbs water of the water source by virtue of the capillary mechanism or the moisture-holding ability thereof to thereby make the thin water film.

As an alternative, the water film maker may be designed to cause the sheet at opposite ends thereof to situate below the surface of the water source to absorb water into a portion of the sheet located above the surface by virtue of the capillary mechanism or the moisture-holding ability, and evaporate the water.

In the present invention, the water film maker may be designed to comprise a first hollow body capable of being filled with air, and a sheet presenting capillary mechanism or having moisture-holding ability, the sheet covering the first hollow body therewith.

By so designing the water film maker, when the first hollow body is filled with air, the first hollow body floats on a water surface and receives sunlights, resulting in that a water film formed by the water film maker is vaporized into water vapor. On the other hand, when air is exhausted out of the first hollow body, the first hollow body sinks into water, and thus, hardly receives sunlights, resulting in that water films are no longer formed, and hence, production of water vapor is suppressed. Thus, it would be possible to control an amount of produced water vapor by carrying out a simple step, that is, controlling an amount of air to be introduced into the first hollow body.

When the water film maker is floated on a surface of sea, salt remains stick to the water film maker with generation of water vapor. If the salt remains unremoved, capillaries could not effectively work, resulting in harmful influence on formation of a water film. Accordingly, it is necessary to remove salt. Exhausting air out of the first hollow body, the water film maker sinks into water, and hence, salt sticking to the water film maker is dissolved in water. This presents high serviceability, because it is no longer necessary to remove salt.

If air is exhausted out of the first hollow body, a volume of the water film maker would decrease, and the water film maker would become flexible, and hence, could be readily folded. Furthermore, if air is exhausted out of the first hollow body, the first hollow body could sink into sea at a depth of tens of meters, resulting in that the water film maker is not influenced by a typhoon. This enables the water film maker to avoid wild weather conditions such as a typhoon.

In addition, when the water film maker designed to include a sheet having moisture-holding ability is caused to sink into water by exhausting air out of the first hollow body, the water film maker absorbs water by virtue of the moisture-holding ability. Thereafter, when the water film maker is caused to float on a surface of water by filling air in the first hollow body, water retained in the water film maker is exposed to sunlight, and thus, is caused to turn into water vapor. Thus, it is possible to produce water vapor merely by carrying out the simple step, that is, periodically repeating filling air in the first hollow body and exhausting air out of the first hollow body.

In the present invention, the apparatus may be designed to include a plurality of the first hollow bodies, wherein each of the first hollow bodies has an opening through which air enters or is exhausted.

By designing the apparatus to include a plurality of the first hollow bodies, it is possible to select the first hollow bodies to be filled with air and the first hollow bodies out of which air is exhausted. The first hollow bodies filled with air float on a surface of water, and produce water vapor, whereas the first hollow bodies out of which air is exhausted sink into water, and hence, do not produce water vapor. Since each of the first hollow bodies is designed to have an opening through which air is filled therein or is exhausted, it is possible to fill each of the first hollow bodies with air or exhaust air out of each of the first hollow bodies, ensuring it possible to control a volume of produced water vapor by means of a simple step. Actually, a ratio of the first hollow bodies to be filled with air to all of the first hollow bodies is determined in accordance with a planned amount of rain-fall.

The apparatus for producing, moving and climbing a mass of water vapor, in accordance with the present invention, includes the above-mentioned apparatus for producing a mass of water vapor, and an apparatus for heating atmospheric air, arranged around the water-vapor producing apparatus. The apparatus for heating atmospheric air, includes a plurality of heaters each having a colored surface, and controls an absorption rate at which the heaters absorb sunlight energy when exposed to sunlight to thereby control both a direction in which atmospheric air including a mass of water vapor produced by the water-vapor producing apparatus and a height at which the atmospheric air climbs.

Sunlight irradiated to the heaters having a colored surface is converted into heat by which atmospheric air including a mass of water vapor having produced as a result of vaporization of water films, and thus, it is possible to climb the mass of water vapor at a desired height, effectively accomplishing artificial stimulation of rain.

Since an absorption rate at which energy is absorbed from sunlight irradiated to the heaters is dependent on a color of a surface of the heaters, it would be possible to control a heat rate by determining a color of a surface of the heaters in accordance with an area in which rain-fall is intended to make and/or weather conditions, to thereby vary the absorption rate. Thus, it is possible to control a height at which a mass of water vapor produced by the apparatus for producing a mass of water vapor climbs.

In the present invention, each of the heaters may be designed to comprise a second hollow body capable of being filled with air.

Filling air in the second hollow body, the second hollow body floats on a surface of water, and absorbs energy of irradiated sunlight. Exhausting air out of the second hollow body, the second hollow body remains in water in a folded condition, and accordingly, the second hollow body does not absorb irradiation heat of sunlight. Thus, only when it is intended to climb a mass of water vapor to thereby cause artificial stimulation of rain, the second hollow body is caused to float on a surface of water by filling air therein, to thereby allow the second hollow body to act as an apparatus for controllably climbing a mass of water vapor. Furthermore, exhausting air out of the second hollow body, the second hollow body sinks into sea at a depth of tens of meters, resulting in that the second hollow body is not influenced by a typhoon and so on, and hence, it is possible for the water film maker to avoid wild weather conditions such as a typhoon.

In the present invention, the second hollow body may be designed to have a heat insulator on a surface thereof, the heat insulator being colored.

The above-mentioned second hollow body may be colored at a surface thereof. As an alternative, by designing the second hollow body to have a heat insulator on a surface thereof, and the heat insulator to be colored, heat is difficult to be transferred to air existing in the second hollow body and/or water existing below the second hollow body, resulting in that it is possible to effectively and concentratedly heat and climb water vapor existing above the second hollow body.

In the present invention, the apparatus may be designed to include a plurality of the second hollow bodies, in which case, each of the second hollow bodies has an opening through which air enters or is exhausted, and is colored.

Since it is possible to fill certain second hollow body or bodies with air in dependence on conditions to thereby cause the second hollow body or bodies to act as a heater, it would be possible to control a degree at which water vapor is heated, merely by selecting the second hollow body or bodies to be filled with air. Thus, it is possible to control a height at which a mass of water vapor climbs, by using the second hollow body or bodies selected as a heater in accordance with a height at which a mass of water vapor has to climb.

In the present invention, a plurality of the water film makers and the heaters may be arranged in a predetermined water area, and a plurality of the water film makers and a plurality of non-heaters may be arranged in a water area other than the predetermined water area.

A mass of water vapor produced above a predetermined water area is heated by means of the heaters, and then, climbs, and further, horizontally moves when it reaches a target height. On the other hand, another mass of water vapor produced above a water area other than the predetermined water area is not heated, because the non-heaters are arranged in the water area, and thus, becomes cold atmospheric air. Since cold atmospheric air is heavy, an atmospheric pressure increases in the water area. Accordingly, the mass of water vapor produced above the water area other than the predetermined water area does not climb, but moves into an area where an atmospheric pressure is reduced above the predetermined water area. This mechanism allows a mass of water vapor to move in a desired direction across different water areas with the result of generation of air current.

A method of causing artificial stimulation of rain, in accordance with the present invention, uses any one of the above-mentioned apparatuses for producing a mass of water vapor or the apparatus for producing, moving and climbing a mass of water vapor, to climb and move atmospheric air including a mass of water vapor to thereby make raindrops, that is, cause artificial stimulation of rain.

The apparatus for producing a mass of water vapor, and the apparatus for producing, moving and climbing a mass of water vapor both in accordance with the present invention make it possible not only to produce a mass of water vapor above a water surface, but also to effectively move and climb the thus produced water vapor, ensuring that it is possible to accomplish artificial stimulation of rain by design not by accident.

The advantages obtained by the aforementioned present invention will be described hereinbelow.

By causing the thin water films formed on a surface of the water film maker to be exposed to sunlight, a temperature of the thin water films increases with a high thermal efficiency up to a temperature at which water is vaporized, and thus, water existing in the thin water films is vaporized, and climbs in the sky, and then, forms a mass of water vapor (cloud) having a high humidity. In addition, it is possible to accomplish an apparatus for producing, moving and climbing a mass of water vapor, which apparatus is capable of moving a mass of produced water vapor in a desired direction, or climbing a mass of produced water vapor at a desired height, and keeping a function of forming a thin water film in order to produce a mass of water vapor. Through the use of the apparatus for producing, moving and climbing a mass of water vapor, it is possible to effectively cause artificial stimulation of rain.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2 is a plan view of the apparatus for producing a mass of water vapor, in accordance with the first embodiment of the present invention.

DESCRIPTION OF THE PREFERRED EMBODIMENTS

The present invention is explained hereinbelow with reference to preferred embodiments in accordance with the present invention.

Figure 1:
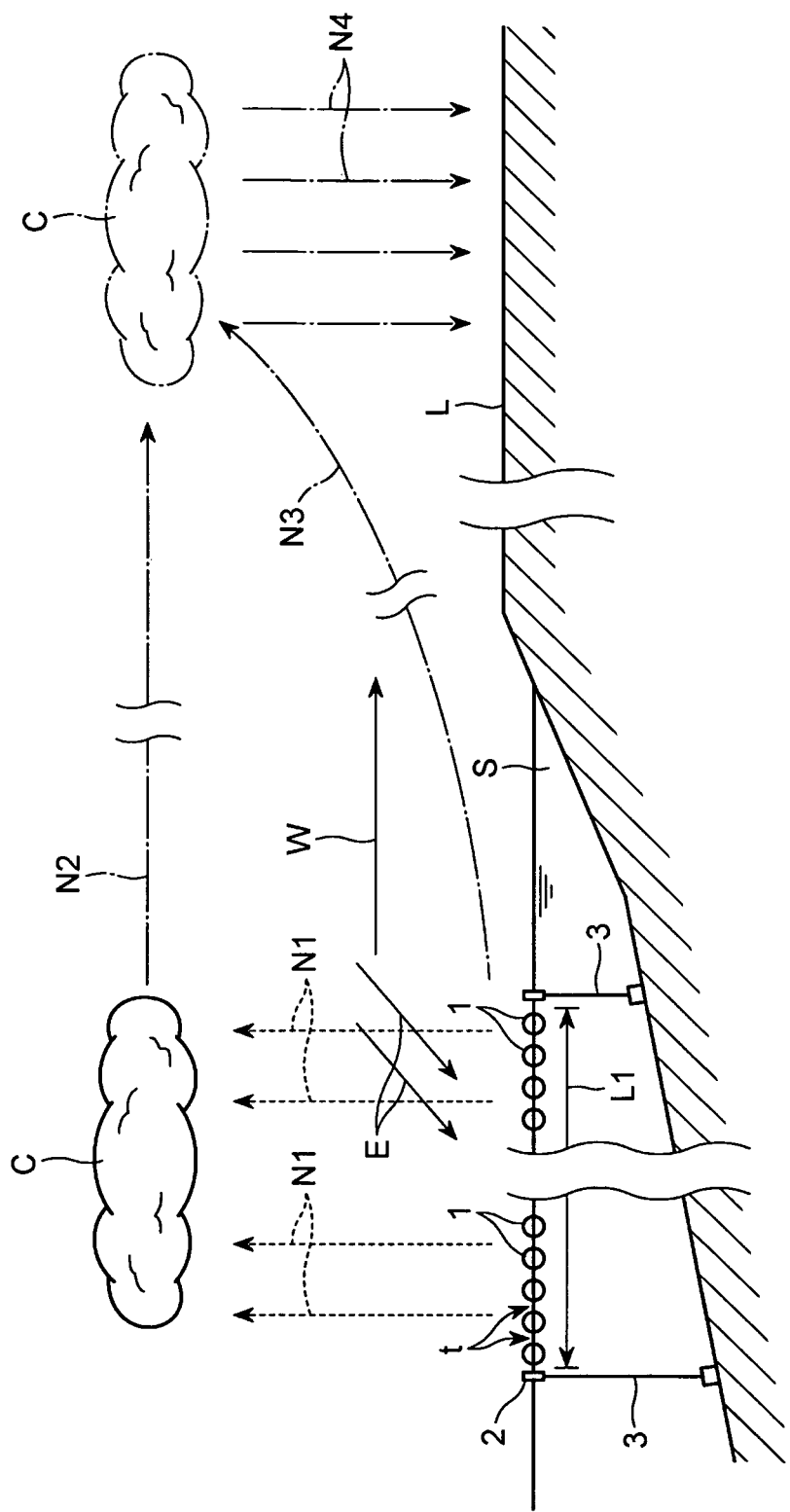
FIG. 1 is an entire side view of the apparatus for producing a mass of water vapor, in accordance with the first embodiment of the present invention.
Figure 3:
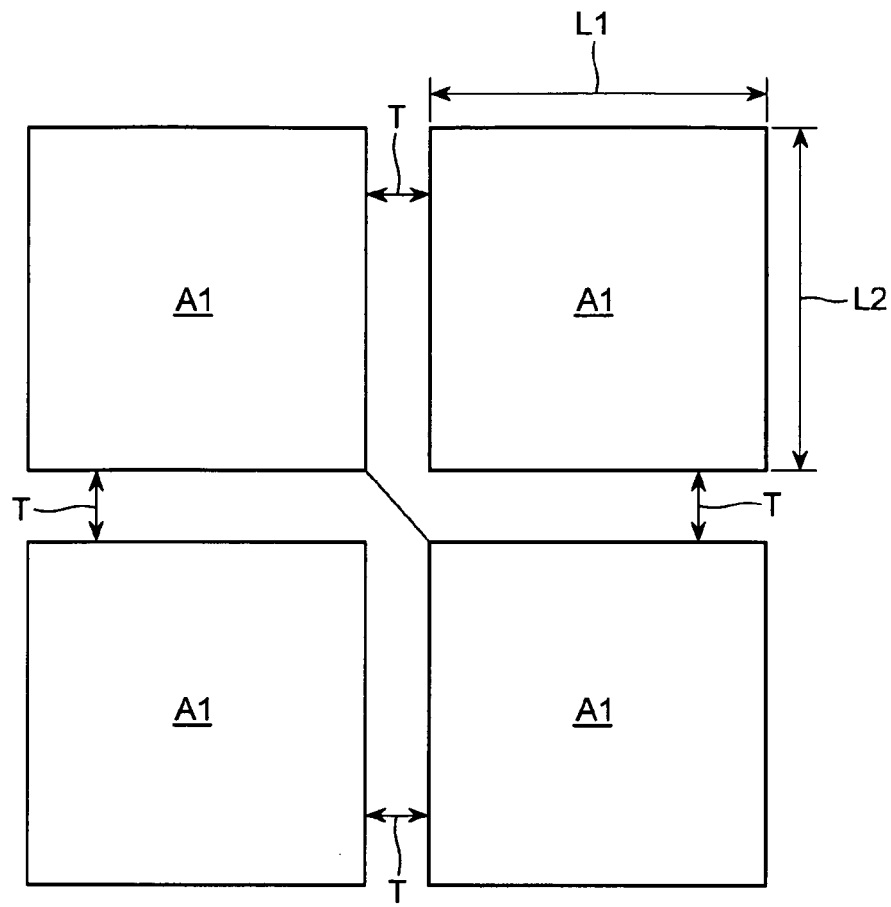
FIG. 3 is a plan view of the apparatus for producing a mass of water vapor, in accordance with the first embodiment of the present invention.
Figure 4:
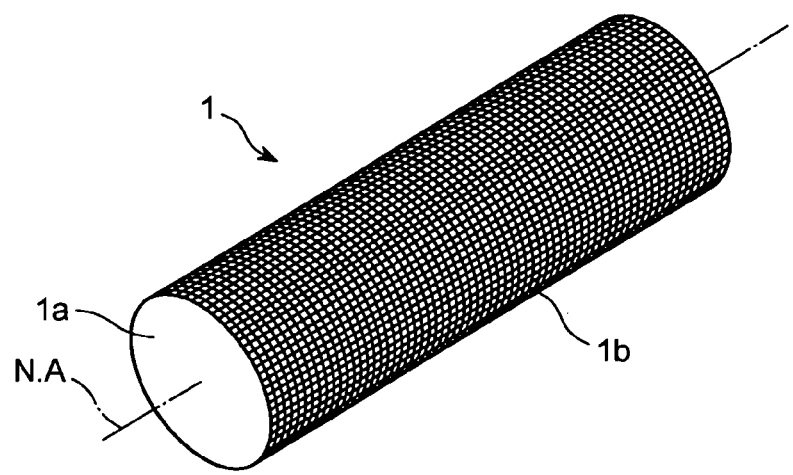
FIG. 4 is a perspective view of the water film maker used in the apparatus for producing a mass of water vapor, in accordance with the first embodiment of the present invention.
Figure 5:
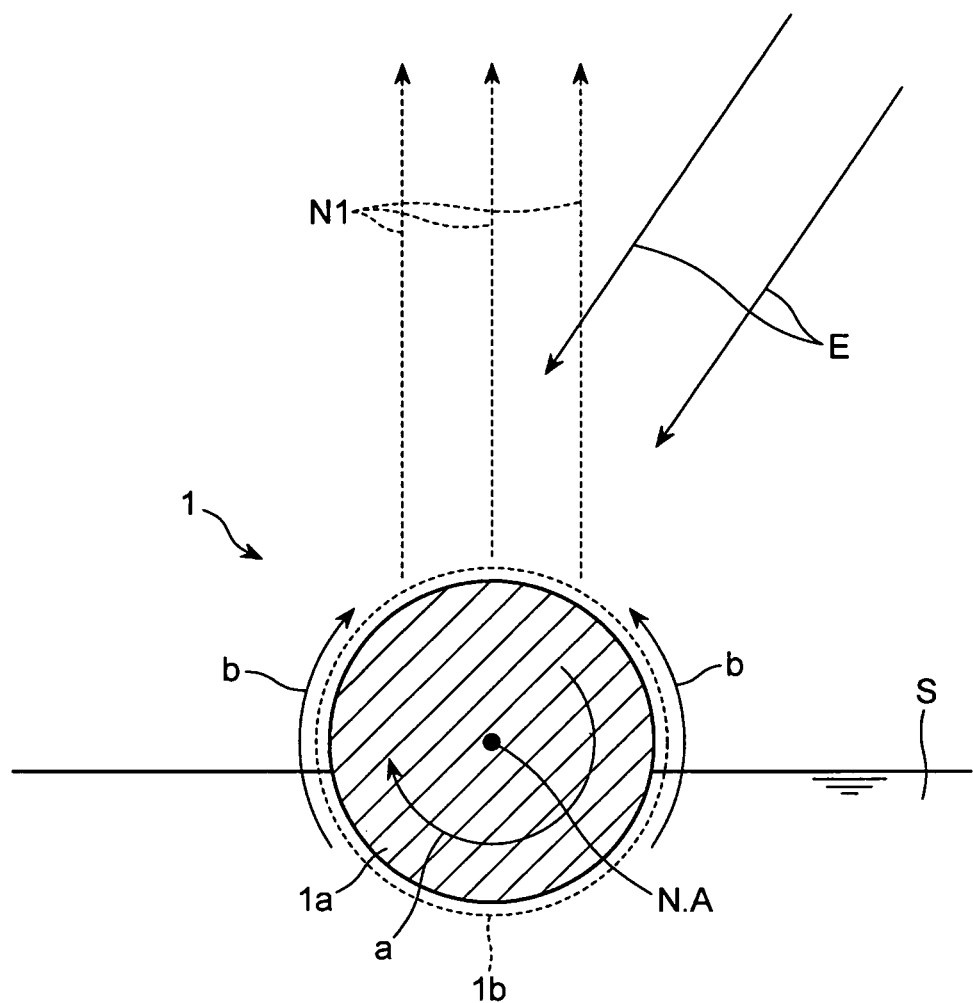
FIG. 5 is a cross-sectional view of the water film maker used in the apparatus for producing a mass of water vapor, in accordance with the first embodiment of the present invention.

FIG. 1 is an entire side view of the apparatus for producing a mass of water vapor, in accordance with the first embodiment of the present invention, FIGS. 2 and 3 are plan views of the apparatus for producing a mass of water vapor, FIG. 4 is a perspective view of the water film maker used in the apparatus for producing a mass of water vapor, and FIG. 5 is a cross-sectional view of the water film maker used in the apparatus for producing a mass of water vapor.

In FIG. 1, a sea "S" as a water source is in the neighborhood of a land "L". A water film maker 1 floats on a surface of sea. In FIGS. 1 and 2, a plurality of water film makers 1 is situated within a frame 2, and flows within the frame 2. The frame 2 is comprised of a floating material such as expanded styrol, air bag and timber. As illustrated in FIG. 1, the frame 2 is fixed to a sea bottom through an anchor 3 such that the frame 2 does not drift due to ocean current. That is, the frame 2 and/or the anchor 3 act (acts) as means for preventing the water film makers 1 from drifting due to ocean current and/or winds. Taking the anchor 3 off, a ship can pull the frame 2 to thereby move the apparatus A1 for producing a mass of water vapor, to another location.

A lateral length L1 and a longitudinal length L2 of the frame 2 may be arbitrarily determined in accordance with geographical and/or weather conditions. Though the lateral length L1 and the longitudinal length L2 are not to be limited to specific length, it is preferable that they are equal to or greater than 1 kilometer, more preferably, 10 kilometers. The apparatus A1 for producing a mass of water vapor, illustrated in FIG. 2, may be singly used. As an alternative, as illustrated in FIG. 3, a plurality of the apparatuses may be used with an interval "T" being equal to or greater than tens of meters in order to usual and/or maintenance ships can sail between them. By arranging the apparatuses A1 for producing a mass of water vapor in a greater number, it is possible to enlarge an area covered by the apparatuses, and hence, produce a mass of water vapor at a higher volume and in a larger area. The apparatus A1 for producing a mass of water vapor is arranged in a water source such as a sea, a lake, a swamp, and a big river situated on the windward side of a desert or an area where it hardly rains. It is preferable that the apparatus A1 for producing a mass of water vapor has such a size that a ship can pull the apparatus. The frame 2 may be a long frame or a ring in shape. The frame 2 may have an arbitrarily determined shape.

FIGS. 4 and 5 illustrate the water film maker 1 in detail.

In FIGS. 4 and 5, the water film maker 1 comprises a pillar 1a, and a sheet 1b covering the pillar 1a therewith, such as a cloth, a sponge or a porous synthetic resin sheet causing capillary mechanism or having moisture-holding ability. The water film maker 1 floats on a surface of sea and plain water (hereinbelow, referred to simply as "water surface"), and is made of a material having a specific weight smaller than that of water, such as expanded styrol or an air bag. It is preferable that the water film maker 1 has a circular cross-sectional shape or a cross-sectional shape close to a circle, such as an octagon, in order to be able to readily rotate around a longitudinal axis N.A thereof due to waves and/or winds (see an arrow "a" in FIG. 5). The pillar 1a may be a hollow cylinder. The water film maker 1 may have an arbitrarily determined size. For instance, the water film maker 1 has a diameter of 50 centimeters, and a length of 10 meters.

As illustrated in FIG. 5, the water film maker 1 is emerged at a lower portion thereof beneath water. The sheet 1b absorbs water by virtue of capillary mechanism and/or moisture-holding ability, and the thus absorbed water transfers to a portion of the sheet 1b situated above the water and exposed to atmospheric air by virtue of capillary mechanism and/or moisture-holding ability (see an arrow "b"). The portion of the sheet 1b situated above the water absorbs water in this way, and thus, there is formed a thin water film exposed to both atmospheric air and sunlight.

Sunlight is irradiated to the thin water film (see an arrow "E"), and hence, water absorbed in the thin water film is vaporized into water vapor (see an arrow "N1" in FIG. 1). By forming a thin water film on a surface of a portion of the water film maker 1 situated above a water surface, water absorbed in the thin water film is readily heated by sunlight energy with a high thermal efficiency up to a temperature at which water is vaporized, and then, is vaporized. Thinner the thin water film is, the more readily water absorbed in the thin water film is vaporized by sunlight energy.

When water contained seawater absorbed in the sheet 1b is vaporized, salt resulted from the vaporization remains and sticks to the sheet 1b. The salt sticking to the sheet 1b deteriorates capillary mechanism and/or moisture-holding ability of the sheet 1b. However, since the water film maker 1 rotates around the axis N.A by virtue of waves and/or winds (see an arrow "a" in FIG. 5), or is bathed at a surface thereof with waves, salt sticking to the sheet 1b dissolves into sea. Thus, it is possible to some degree to prevent the deterioration of capillary mechanism and/or moisture-holding ability of the sheet 1b, caused by salt sticking thereto, and the sheet 1b floating on a water surface with water absorbed therein having been vaporized continuously absorbs seawater by virtue of capillary mechanism and/or moisture-holding ability of the sheet 1b (see an arrow "b" in FIG. 5). Since salt does not exist in a plain-water lake, swamp or river, there is not caused the problem of salt sticking to the sheet 1b.

As illustrated in FIGS. 1 and 2, a plurality of the water film makers 1 floats on a surface of sea. There are formed small gaps "t" (for instance, about 10 centimeters) between the adjacent water film makers 1 in order for each of the water film makers 1 to be able to rotate. Of course, there is not caused any problem even if the water film makers 1 make collision with each other. As having been explained with reference to FIG. 5, the water film makers 1 produce water vapor, and the thus produced water vapor climbs (see an arrow "N1"), resulting in that a mass of water vapor (cloud) C having a high humidity is formed in the sky.

The mass of water vapor C almost vertically climbs when no winds blow (see an arrow "N1"), and then, moves towards the land L by air currents (winds) (see an arrow "N2"). When sea winds W blow, the mass of water vapor obliquely climbs towards the land (see an arrow "N3"). Air currents are born by various reasons. A typical air current is sea wind W. The reason why sea wind W blows is that a temperature at the land L rises in daytime, and hence, air in the land L climbs, resulting in that air existing above sea and having a relatively low temperature moves towards the land L.

When sunlight energy weakens in late afternoon, a temperature in the sky gradually lowers, and further lowers after sundown or at night. Accordingly, water vapor contained in the mass of water vapor C existing in the sky is cooled in low-temperature atmosphere in the sky to thereby turn into raindrops and/or ices. The thus produced raindrops and/or ices fall onto the land L as rain and/or snow (see an arrow "N4" in FIG. 1).

Figure 6:
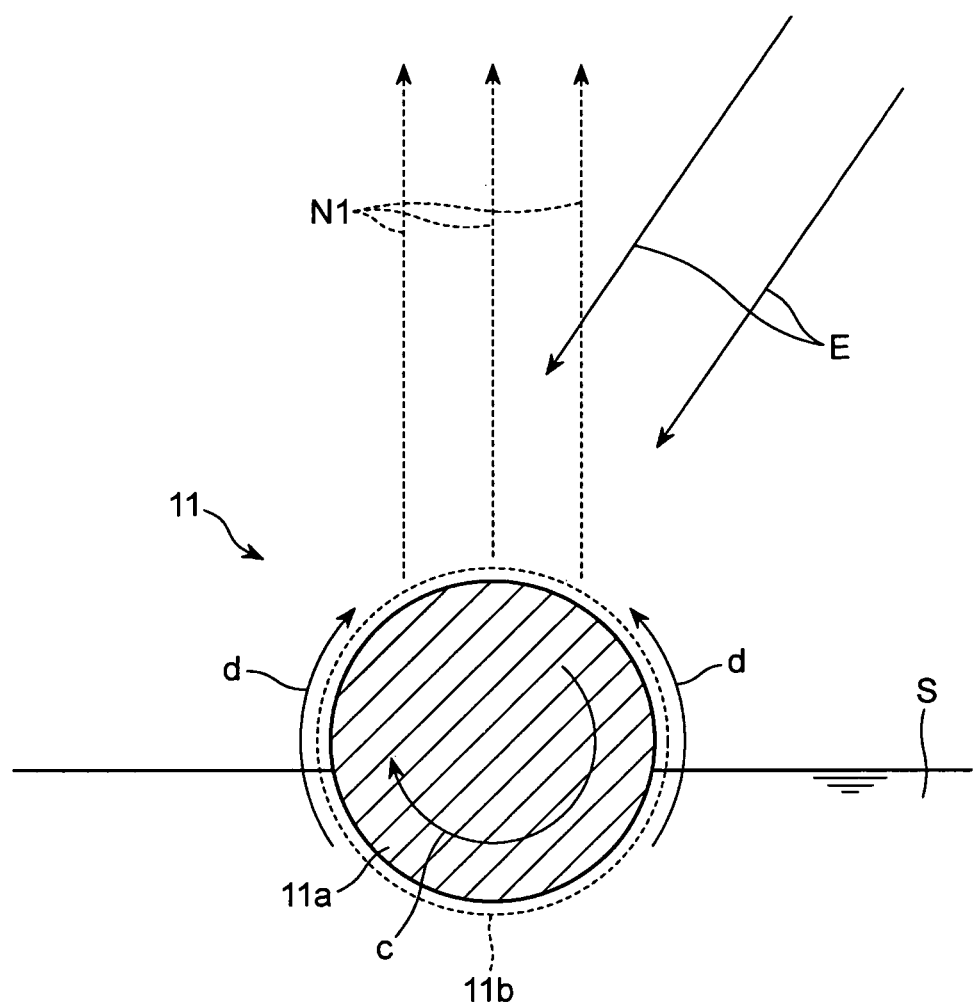
FIG. 6 is a cross-sectional view of the water film maker in the second embodiment of the present invention.
Figure 7:
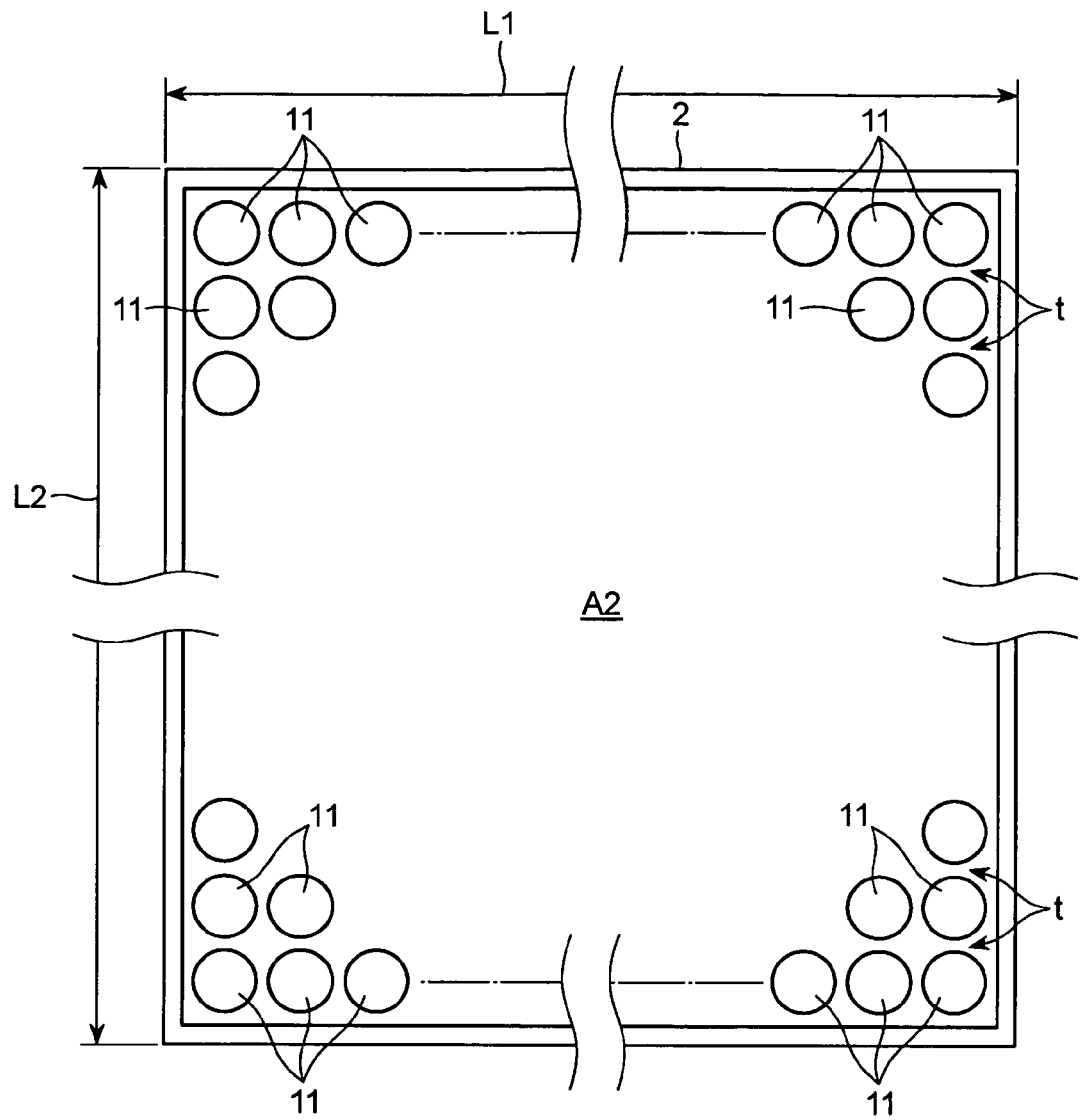
FIG. 7 is a plan view of the apparatus for producing a mass of water vapor, arranged in a sea, a lake, a swamp or a river, in accordance with the second embodiment of the present invention.

FIG. 6 is a cross-sectional view of the water film maker in the second embodiment of the present invention, and FIG. 7 is a plan view of the apparatus for producing a mass of water vapor, including the water film makers arranged in a sea, a lake, a swamp or a river.

The water film maker 11 is spherical, and comprises a ball 11a comprised of expanded styrol or an air bag, and a sheet lib causing capillary mechanism or having moisture-holding ability, and covering the ball 11a therewith. The water film maker 11 floats on a water surface, and is able to rotate in all directions by waves (see an arrow "c"). Similarly to FIG. 2, a plurality of the water film makers 11 floats within the frame 2. The sheet 11b of the water film maker 11 absorbs water by virtue of capillary mechanism or moisture-holding ability (see an arrow "d"). On a portion of the sheet 11b situated above a water surface is formed a thin water film exposed to sunlight (see an arrow "d"). Water existing in the thin water film is readily vaporized by sunlight energy, and climbs (see an arrow "N1"). The arrangement of the frame 2 is identical to that of the first embodiment. Similarly to the apparatuses A1 for producing a mass of water vapor, illustrated in FIG. 3, the apparatuses A2 for producing a mass of water vapor, illustrated in FIG. 7 may be used in a plurality. Furthermore, the ball 11a may be hollow.

Since the ball 11a has a high surface area, the sheet 11b is able to form a thin water film having a high surface area, on a water surface. Furthermore, the water film maker 11 can rotate in all directions on a water surface by virtue of waves and/or winds. Accordingly, salt having remained sticking to the sheet 11b dissolves into sea when water is vaporized. In order for the water film maker 11 to be able to rotate, there are formed gaps "t" between the water film makers 11. The mechanism for causing artificial stimulation of rain in accordance with the second embodiment is the same as that of the first embodiment.

Figure 8:
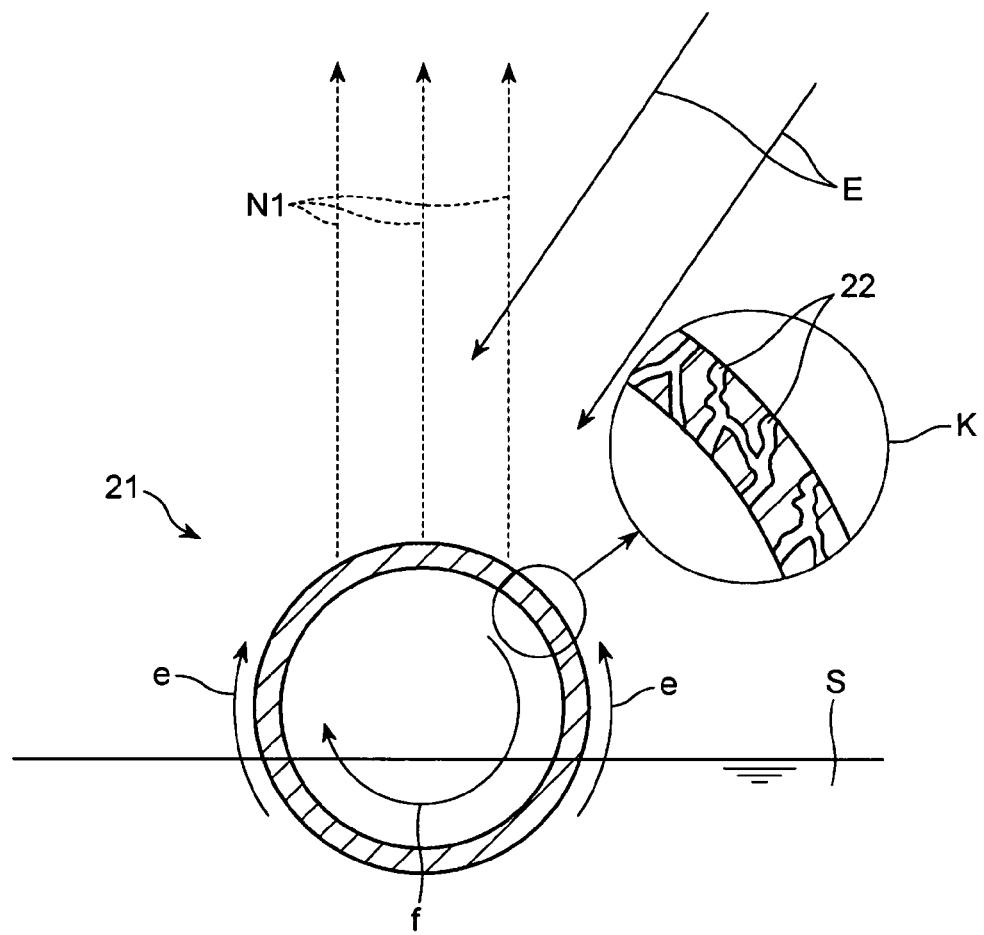
FIG. 8 is a cross-sectional view of the water film maker in the third embodiment of the present invention.

FIG. 8 is a cross-sectional view of the water film maker in the third embodiment of the present invention. A water film maker 21 comprises a hollow ball composed of synthetic resin having elasticity and being porous. As illustrated in the partially enlarged view "K", the water film maker 21 has holes 22 providing capillary mechanism. The water film maker 21 is used in the same way as that of the water film maker 11 in the second embodiment. It is not necessary to use the above-mentioned sheet lib, because the water film maker 21 can provide capillary mechanism by itself, and thus, can absorb water (see an arrow "e") to thereby form a thin water film on a water surface, where the thin water film is exposed to sunlight. Water absorbed into a portion of the water film maker 21 situated above a water surface is vaporized by sunlight energy (see an arrow "E"), climbs in atmospheric air (see an arrow "N1"), and forms the above-mentioned mass of water vapor C. In addition, the water film maker 21 can rotate by winds and/or waves (see an arrow "f"), and thus, salt having remained sticking to inner walls of the holes 22, resulting from the vaporization of water on a water surface, is emerged and dissolved into sea. The mechanism for causing artificial stimulation of rain is the same as that of the first embodiment.

Figure 9:
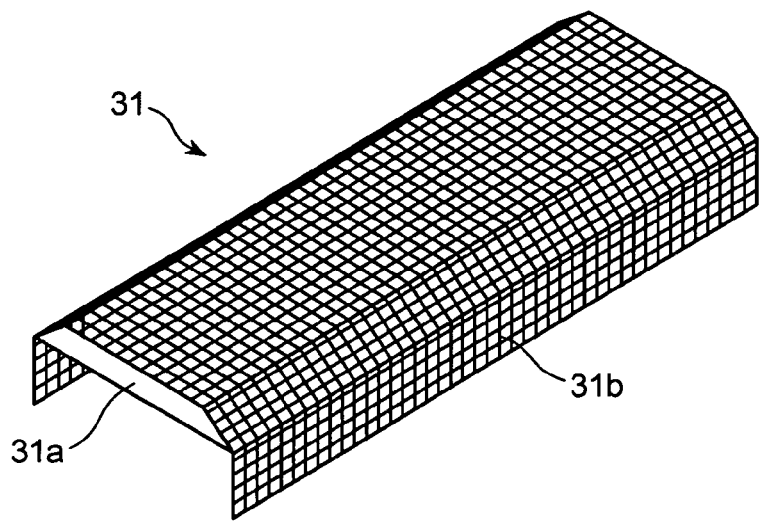
FIG. 9 is a perspective view of the water film maker in the fourth embodiment of the present invention.
Figure 10:
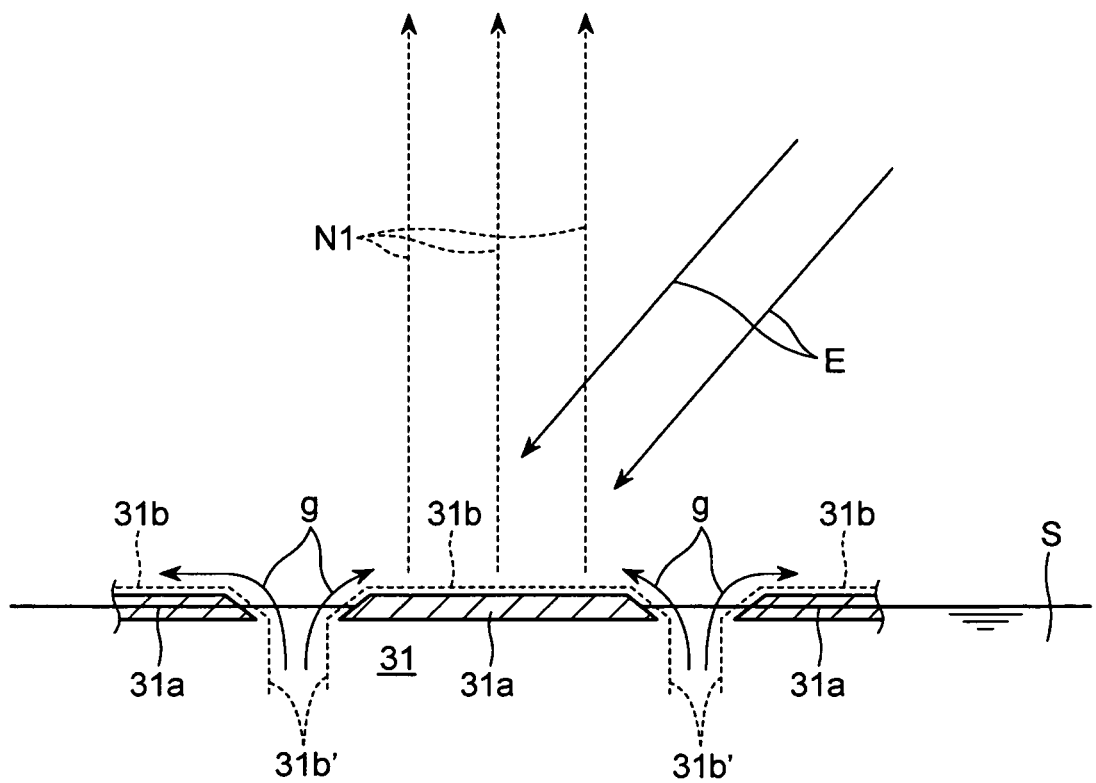
FIG. 10 is a cross-sectional view of the water film maker in the fourth embodiment of the present invention.
Figure 11:
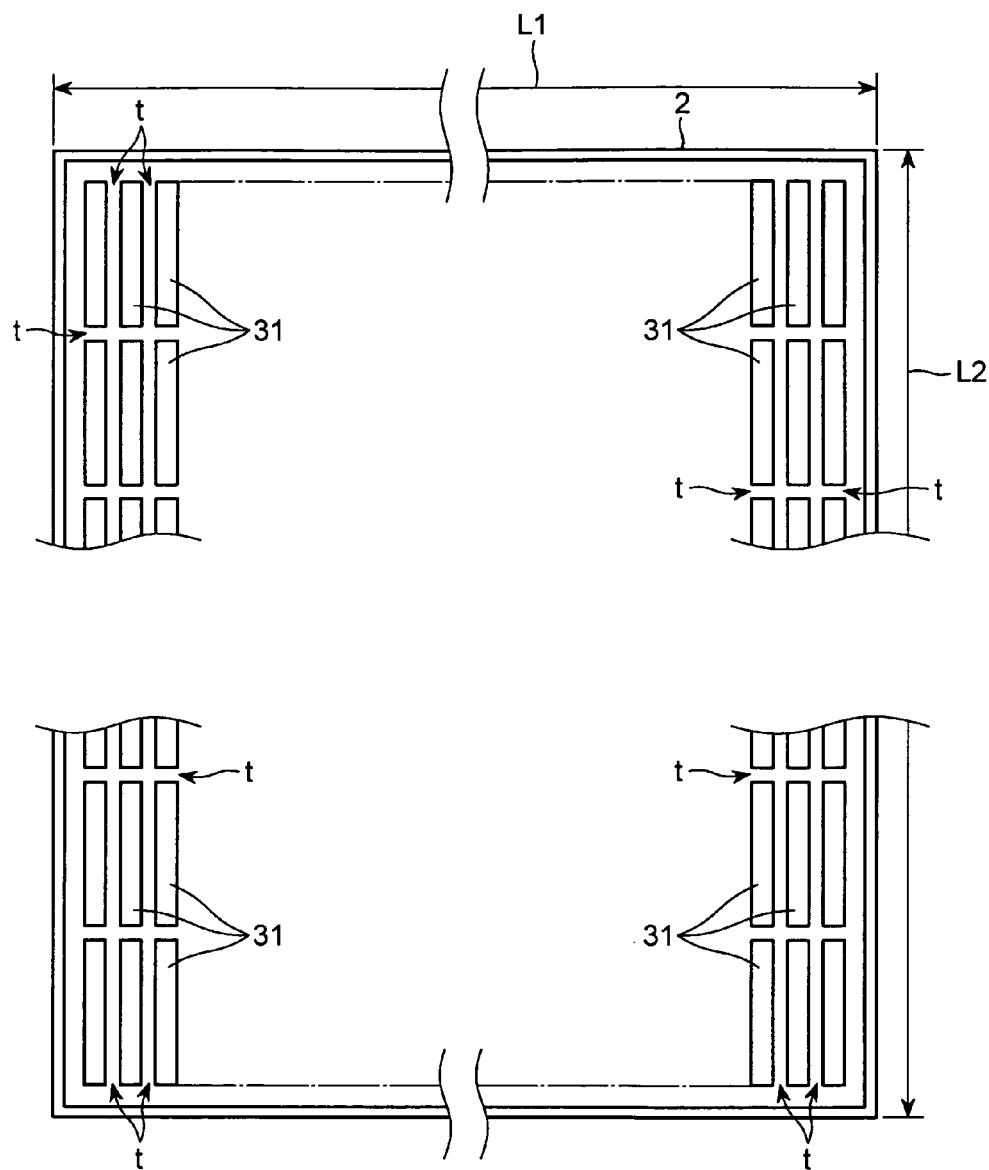
FIG. 11 is a plan view of the apparatus for producing a mass of water vapor, in accordance with the fourth embodiment of the present invention.

FIG. 9 is a perspective view of the water film maker in the fourth embodiment of the present invention, FIG. 10 is a cross-sectional view of the water film maker, and FIG. 11 is a plan view of the apparatus for producing a mass of water vapor.

FIGS. 9 and 10, a water film maker 31 comprises a long board 31a having a trapezoidal cross-section, and a sheet 31b covering the board 31a therewith and providing capillary mechanism. Furthermore, as illustrated in FIG. 11, the water film makers 31 float with gaps "t" being present between adjacent ones. The sheet 31b hangs down at opposite ends 31b' thereof into sea, and thus, the opposite ends 31b' absorb seawater by virtue of the capillary mechanism up to the sheet 31b situated on an upper surface of the board 31a situated above a water surface (see an arrow "g"). As illustrated in FIG. 11, a plurality of the water film makers 31 is arranged on a sea, similarly to FIG. 2.

The sheet 31b situated on an upper surface of the board 31a absorbs seawater by virtue of the capillary mechanism, and forms a thin water film on a water surface, which film is exposed to sunlight. By being exposed to sunlight (see an arrow "E"), water absorbed in the thin water film is vaporized, and climbs (see an arrow "N1"), and then, forms a mass of water vapor (clouds) C in the sky, similarly to FIG. 1. Salt remaining sticking to the sheet 31b situated on an upper surface of the board 31a dissolves into sea, when the water film maker 31 receives waves. The mechanism for causing artificial stimulation of rain is the same as that of the first embodiment. The board 31a may be covered with the sheet 31b by tying the opposite ends 31b' to each other.

As is obvious in light of the first to fourth embodiments, a material, a shape, a configuration and/or a size of the water film maker for producing a mass of water vapor may be arbitrarily selected. In brief, a thin water film which will be exposed to sunlight to thereby be heated by sunlight energy, and be vaporized is formed by virtue of capillary mechanism on a water surface of a sea or a lake, and water lost by vaporization out of the water film maker is continuously supplemented by virtue of capillary mechanism and/or moisture-holding ability by absorbing water out of a water source such as a sea, a lake, a swamp and a river to thereby continuously form the thin water films. A mass of water vapor produced by the vaporization of water contained in the thin water films climbs in the sky, and then, is cooled to thereby cause artificial stimulation of rain.

The subject matter encompassed by way of the present invention is not to be limited to the first to fourth embodiments. On the contrary, it includes all alternatives, modifications and equivalents. For instance, in the first to fourth embodiments, the water film makers 11, 21, 31 situated outermost may be designed to tie with an anchor to thereby prevent the water film makers from drifting, in which case, it is not necessary for the apparatus to include the frame 2. Furthermore, though the first, second and fourth embodiments are designed to use a sheet presenting capillary mechanism to accomplish capillary mechanism, the water film maker may be designed to have capillary mechanism at a surface thereof, for instance, by coating the water film maker with porous synthetic resin presenting capillary mechanism.

It does not always rain even in accordance with the present invention. A probability at which it rains is dependent on a total surface area of the apparatus for producing a mass of water vapor, a degree with which the sheet or the water film maker absorbs water by virtue of capillary mechanism, a location where the apparatus for producing a mass of water vapor is situated, and/or weather conditions in the vicinity of an area where a mass of water vapor climbs and moves. For instance, the greater a total surface area of the apparatus for producing a mass of water is, the higher a probability with which artificial stimulation of rain is caused is. Dry ices may be dispersed at a predetermined timing into a mass of water vapor formed in the sky to thereby facilitate generation of raindrops. By together carrying out the conventional methods of causing artificial stimulation of rain, it is expected to be able to cause artificial stimulation of rain at a high probability. Under strong wind conditions, a probability with which it rains is quite low, because water vapor produced by vaporizing water contained in the water film makers is dispersed into atmospheric air. Thus, what is important is that a monthly or annual amount of rain-fall desired in a dry area can be obtained under required cost performance such as facility costs and/or maintenance fees.

Figure 12A:
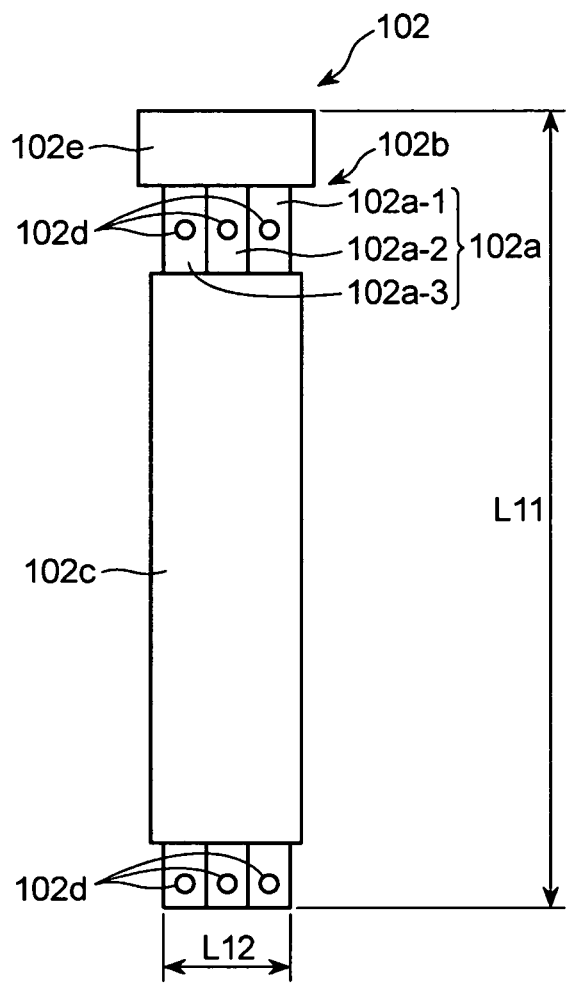
FIG. 12A is a plan view of the water film maker in accordance with the fifth embodiment, to be used in the apparatus for producing, moving and climbing a mass of water vapor, in accordance with the present invention.
Figure 12B:
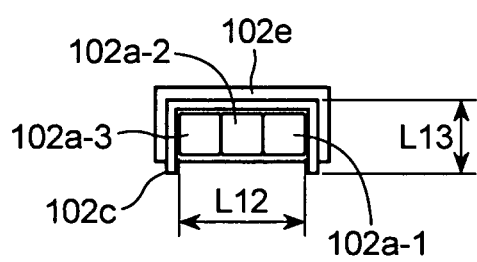
FIG. 12B is a side view of the water film maker illustrated in FIG. 12A.

FIG. 12A is a plan view of a water film maker in accordance with the fifth embodiment, used in the apparatus for producing, moving and climbing a mass of water vapor, in accordance with the present invention, and FIG. 12B is a side view of the water film maker.

In FIG. 12A, a water film maker 102 comprises a joined bodies 102b including a plurality of hollow bodies 102a joined to each other and each capable of being filled with air and exhausting air out thereof, and a sheet 102c covering most of portions of a surface of the joined bodies 102b and presenting capillary mechanism and/or having moisture-holding ability. Each of the hollow bodies 102a is designed to a rectangular parallelepiped, however, is not to be limited to a rectangular parallelepiped. For instance, each of the hollow bodies 102a may be designed to be an ellipse. Furthermore, in the water film maker 102, the joined bodies 102b comprised of the hollow bodies 102a and the sheet presenting capillary mechanism may be formed integral with each other through the use of porous synthetic resin.

Each of the hollow bodies 102a is designed to have an air valve 102d acting as an air inlet and outlet. Air is filled into the hollow body 102a through the air valve 102d, and air is exhausted out of the hollow body 102a through the air valve 102d. A hollow body 102e may be arranged in the vicinity of the air valves 102d in order to surely cause the air valves 102d to float on a water surface. By arranging the hollow body 102e, the air valves 102d can be readily open and closed. In addition, by arranging an air pump in the vicinity of the air valves 102d, it is possible to fill the hollow bodies 102a with air and exhaust air out of the hollow bodies 102a by remote control. Though FIGS. 12A and 12B illustrate the hollow body 102e is arranged only at an end of the hollow bodies 102a, the hollow bodies 102e may be arranged at opposite ends of the hollow bodies 102a. Furthermore, the hollow body 102e may be designed to have an air valve through which the hollow body 102e is filled with air and air is exhausted out of the hollow body 102e.

In the present embodiment, the water film maker 102 forms a thin water film, and the thin water film is heated by sunlight up to a temperature at which water is vaporized, to thereby produce water vapor, in the same way as the first embodiment. In addition, after air is exhausted out of the hollow bodies 102*a* through the air valves 102*d*, the hollow bodies 102*a* sink into the sea, and are difficult to receive sunlight. As a result, generation of water vapor is suppressed to thereby be able to control an amount of produced water vapor.

Furthermore, when the water film maker 102 sinks into water, salt sticking to the water film maker 102 is dissolved in the water, ensuring it not necessary to carry out any steps for removal of salt, and thus, keeping the water film maker 102 to work well merely by carrying out a simple step.

Since the joined bodies 102*b* includes a plurality of the hollow bodies 102*a*, if air is exhausted out of one or more specific hollow body (bodies) 102*a*, only the specific hollow body (bodies) 102*a* sinks into water, ensuring it possible to control an amount of water vapor to be produced by the water film maker 102. As an alternative, if air is exhausted out of all of the hollow bodies 102*a*, the water film maker 102 would have a reduced volume to thereby become flexible, resulting in that the water film maker 102 can be folded for movement.

As mentioned above, filling all of the hollow bodies 102*a* with air, the water film maker 102 flatly floats on a water surface, whereas exhausting air out of all of the hollow bodies 102*a*, the water film maker 102 sinks into water. When the water film maker 102 sinks into water, if the water film maker 102 horizontally expands in the water, the water film maker 102 shuts sunlight down, resulting in that sunlight does not reach to underwater plants or organisms existing below the expanding water film maker 102, and hence, may be harmfully influenced.

In order to prevent this problem, the hollow body 102*e* arranged at one end of the hollow bodies 102*a* may be filled with air, in which case, the hollow body 102*e* floats on a water surface and the hollow bodies 102*a* out of which air was exhausted are situated beneath the floating hollow body 102*e*. That is, the water film maker 102 floats vertically to a water surface, and hence, it is possible to prevent the water film maker 102 from shutting sunlight down, ensuring it to prevent underwater plants and organisms from being harmfully influenced. Furthermore, by exhausting air out of the hollow bodies 102*a* and the hollow body 102*e*, they sink into sea at a depth of tens of meters, ensuring that they are not influenced by a typhoon, and hence, they can avoid wild weather condition such as a typhoon.

In addition, when the water film maker 102 designed to include a sheet having moisture-holding ability is caused to sink into water by exhausting air out of the first hollow bodies 102*a*, the water film maker 102 absorbs water by virtue of the moisture-holding ability. Thereafter, when the water film maker 102 is caused to float on a water surface by filling air in the first hollow bodies 102*a*, water retained in the water film maker 102 is exposed to sunlight, and thus, is vaporized into water vapor. Thus, it is possible to produce water vapor merely by carrying out the simple step, that is, periodically repeating filling air in the first hollow bodies 102*a* and exhausting air out of the first hollow bodies 102*a*.

For instance, air is exhausted out of the hollow body 102*e*, and only a hollow body 102*a*-1 situated at one of the hollow bodies 102*a* is filled with air, and air is exhausted out of the rest of hollow bodies 102*a*-2 and 102*a*-3. In such a condition, the water film maker 102 is emerged into water with the hollow body 102*a*-1 floating at one end thereof on a water surface, and hence, the water film maker 102 absorbs water. Thereafter, filling air in the hollow bodies 102*a*-2 and 102*a*-3, the water film maker 102 floats on a water surface, resulting in that water absorbed in the water film maker 102 is exposed to sunlight, and thus, is vaporized. As explained above, the use of the sheet having moisture-holding ability makes it possible to form a water film without emerging the sheet 102*c* into water at opposite ends thereof, and accordingly, even if the sheet 102*c* is designed to be shorter than the illustrated one such that the sheet 102*c* covers an upper surface of the hollow bodies 102*a* therewith, the water film maker 102 can maintain a function of forming a water film.

Furthermore, by designing the water film maker 102 in the above-mentioned manner, when only the hollow body 102*a*-1 is filled with air, and air is exhausted out of the hollow bodies 102*a*-2 and 102*a*-3, the hollow body 102*a*-1 is situated above the hollow bodies 102*a*-2 and 102*a*-3 out of which air was exhausted, resulting in that the water film maker 102 floats vertically to a water surface, and hence, it is possible to prevent the water film maker 102 from shutting sunlight down. This ensures it to prevent underwater plants and organisms from being harmfully influenced by the water film maker 102.

A length L11, a width L12 and a height L13 of the water film maker 102 is determined in accordance with weather conditions and/or geographical conditions. In an example, L11 may be set to be 100 meters, L12 to be 1 meter, and L13 to be 0.1 meter.

It is preferable that a color of a surface of the above-mentioned the water film makers 1, 11, 21, 31 and 102 is black, because a black surface makes it possible to effectively absorb heat caused by sunlight and vaporize water absorbed in the water films. However, any color may be selected in accordance with conditions.

Furthermore, in the water film maker 102, an adiabatic sheet may be sandwiched between the joined bodies 102*b* comprised of the hollow bodies 102*a* and the sheet 102*c* presenting capillary mechanism. As an alternative, they may be constructed integral with one another.

Figure 13:
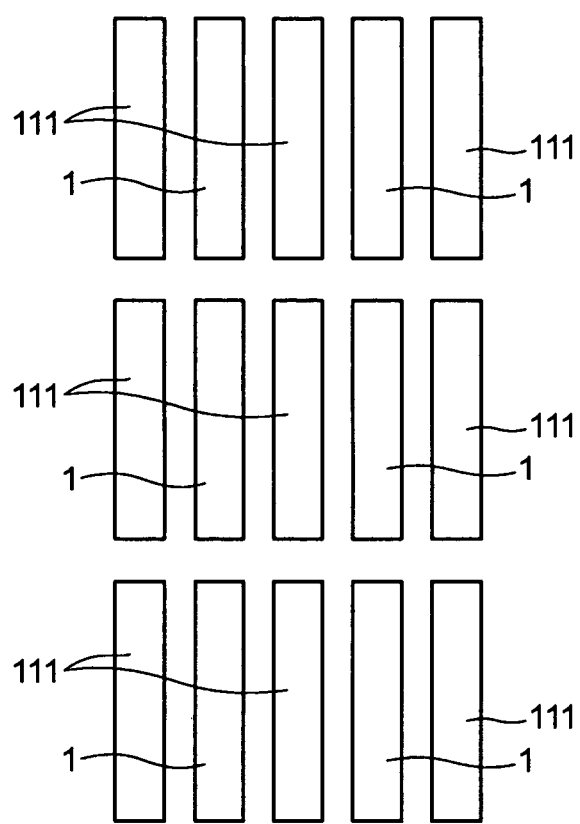
FIG. 13 is a plan view of the apparatus for producing, moving and climbing a mass of water vapor, in accordance with the present invention.

FIG. 13 is a plan view of the apparatus for producing, moving and climbing a mass of water vapor, in accordance with the present invention, looking from the sky.

In FIG. 13, the water film makers 1 and the heaters 111 are arranged alternately row by row, and float on a water surface. Each of the water film makers 1 acts as an apparatus for producing a mass of water vapor, and each of the heaters 111 acts as an apparatus for heating atmospheric air. A pattern for arranging the water film makers 1 and the heaters 111 is not to be limited to one illustrated in FIG. 13. Any pattern may be selected if only the heaters 111 are arranged around the water film maker 1.

In the above-mentioned arrangement, the water film maker 102 in accordance with the fifth embodiment may be used in place of the water film maker 1.

Figure 14A:
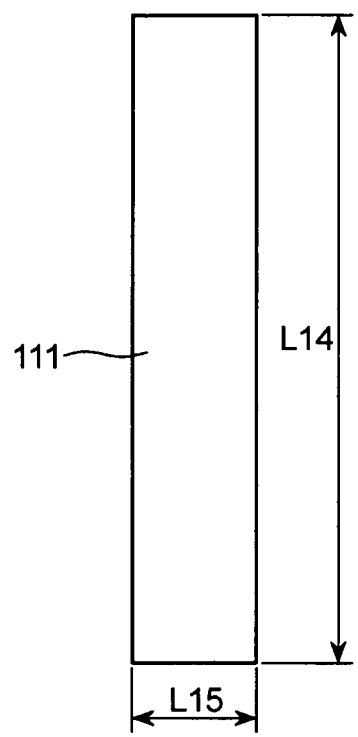
FIG. 14A is an enlarged plan view of the heater in accordance with the first embodiment.
Figure 14B:
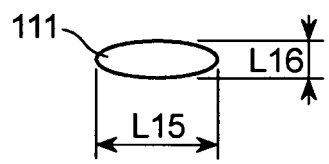
FIG. 14B is a side view of the heater illustrated in FIG. 14A.

FIG. 14A is an enlarged plan view of the heater 111 in accordance with the first embodiment, to be used in the apparatus for producing, moving and climbing a mass of water vapor in accordance with the present invention, and FIG. 14B is a side view of the heater 111.

A length L14, a width L15 and a height L16 of the heater 111 are determined in accordance with a size of the water film maker 1, weather conditions, and/or geographical conditions, and so on. In an example, a length L14 may be set to be 100 meters, L15 to be 1 meter, and L16 to be 0.1 meter.

Each of the heaters 111 has a colored surface. The heaters 111 are exposed to sunlight, and absorb sunlight energy, which will be converted to heat. Since the heaters 111 are arranged around the water film maker 1, water vapor produced by the water film maker 1 is heated by the heaters 111, and thus, turns into ascending air current to thereby produce a mass of water vapor in the sky, having a high humidity, that is clouds.

In order to effectively accomplish artificial stimulation of rain, it is necessary to climb a mass of produced water vapor up to a height at which winds blow towards an area where it is intended to rain, in which case, the height is dependent on how much a mass of water vapor is heated. Since a rate at which the heaters 111 absorb sunlight energy is dependent on a color of the heaters 111, a degree to which a mass of water vapor is heated by the heaters 111 varies in dependence on a color of the heaters 111. That is, the heaters 111 act as an apparatus for controllably heating a mass of water vapor, and accordingly, it is possible to control a height at which a mass of water vapor can climb. For instance, if the heaters 111 are colored black, a heat-absorption rate is maximized, because the black heaters 111 absorb sunlight energy of visible lights in all wavelength bands. Selecting a color other than black, the heaters 111 absorb sunlight energy of visible lights in wavelength bands other than wavelength bands for the selected color, it is possible to have a sunlight energy absorption rate in dependence on the selected color. Furthermore, since an amount of heat increases in proportion with an area of surfaces at which the heaters 111 receive sunlight, it is possible to control an amount of heat by varying a surface area of the heaters 111 at which the heaters 111 receive sunlight.

After reaching the sky, a mass of water vapor is cooled into raindrops, and as a result, it rains. Air currents blow in the sky. Thus, detecting a height at which air currents blow, a mass of water vapor is caused to climb up to the detected height to thereby ride on the air currents. Thus, it is possible to accomplish artificial stimulation of rain even in a land towards which air currents blow. As mentioned so far, the present invention makes it possible, unlike the conventional art, not only to artificially produce a mass of water vapor, but also to artificially climb a mass of produced water vapor up to a desired height to thereby form raindrops there.

Figure 15A:
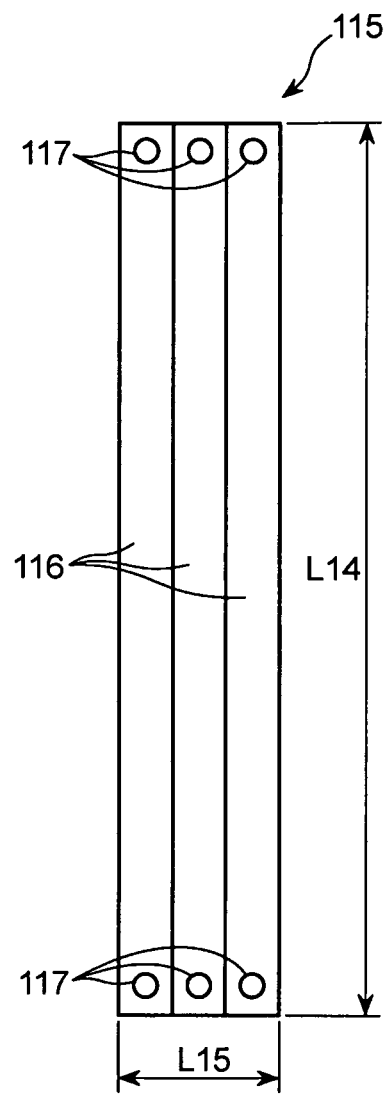
FIG. 15A is an enlarged plan view of the heater in accordance with the second embodiment, looking from the sky.
Figure 15B:
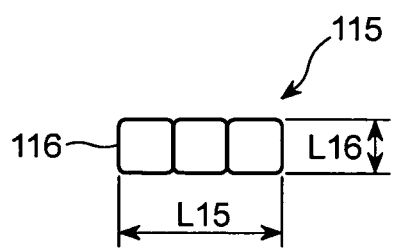
FIG. 15B is a side view of the heater illustrated in FIG. 15A.

FIG. 15A is an enlarged plan view of the heater 115 in accordance with the second embodiment, looking from the sky, to be used in the apparatus for producing, moving and climbing a mass of water vapor in accordance with the present invention. FIG. 15B is a side view of the heater 115. In this embodiment, a length L14, a width L15 and a height L16 of the heater 115 are determined in accordance with a size of the water film maker 1, weather conditions, and/or geographical conditions, and so on. In an example, a length L14 may be set to be 100 meters, L15 to be 1 meter, and L16 to be 0.1 meter.

In FIG. 15A, the heater 115 comprises a plurality of hollow bodies 116 joined to one another and each capable of being filled with air. Each of the hollow bodies 116 is designed to have an air valve 117 acting as an air inlet and outlet.

Filling air in the hollow bodies 116, the hollow bodies 116 float on a water surface, where a surface of the hollow bodies 116 is exposed to sunlight, and water vapor is heated by heat converted from sunlight energy, and climbs. Exhausting air out of the hollow bodies 116 through the air valves 117, the hollow bodies 116 are folded into a small size and sink into water. Accordingly, sunlight does not reach the hollow bodies 116, and hence, the heaters 115 do not produce heat. Thus, merely by filling the hollow bodies 116 with air through the air valves 117 or exhausting air out of the hollow bodies 116 through the air valves 117, it is possible to cause the hollow bodies 116 to act as a heater 115 when necessary. It is possible to cause the air valves 117 to open or close through wireless signals transmitted from a remote control device. Furthermore, exhausting air out of the hollow bodies 116, the hollow bodies 116 sinks into sea at a depth of tens of meters, resulting in that the hollow bodies is not influenced by a typhoon and so on, and hence, it is possible for the heater to avoid wild weather conditions such as a typhoon.

By adding a body having the same function as that of the hollow body 102 illustrated in FIGS. 12A and 12B to the heater 115, the air valves 117 could be readily open and closed. Accordingly, it is preferable to add the hollow body 102 to the heater 115 for filling the hollow bodies 116 with air through the air valves 117 or exhausting air out of the hollow bodies 116 through the air valves 117 under remote control.

All of the hollow bodies 116 may be colored in a common color, but the hollow bodies 116 may be colored in different colors from one another. If they are colored differently from one another, when the hollow bodies 116 are exposed to sunlight, rates at which each of the hollow bodies 116 absorbs sunlight energy are different from one another. Thus, if air is filled in the hollow body or bodies 116 being colored in a specific color(s), and air is exhausted out of the rest of the hollow bodies 116, the hollow bodies 116 out of which air was exhausted would become deflated due to pressures of the hollow bodies 116 in which air is filled, resulting in that the hollow bodies 116 out of which air was exhausted could not act as the heaters 115. Accordingly, by causing the hollow body or bodies 116 being colored in a specific color(s) to act as the heater or heaters 115 in accordance with conditions, it is possible to control an amount of heat absorbed into a mass of water vapor from the heaters 115.

Figure 16:
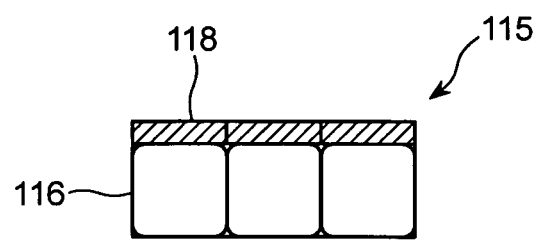
FIG. 16 depicts an example of the heat insulator arranged on a surface of the hollow body.

FIG. 16 illustrates the hollow body having a heat insulator covering a surface thereof.

In FIG. 16, an adiabatic sheet 118 composed of heat insulator covers a surface of the hollow body 116, and the adiabatic sheet 118 is colored. Heat produced by the adiabatic sheet 118 when exposed to sunlight is difficult to be transferred into air existing in the hollow bodies 116 or water existing beneath the hollow bodies 116, ensuring is possible to effectively heat water vapor existing above the hollow bodies 116.

Though the adiabatic sheet 118 is designed to cover only an upper surface of the hollow bodies 116 therewith in FIG. 16, the adiabatic sheet 118 may be designed to cover entire surface of the hollow bodies 116 therewith.

Figure 17:
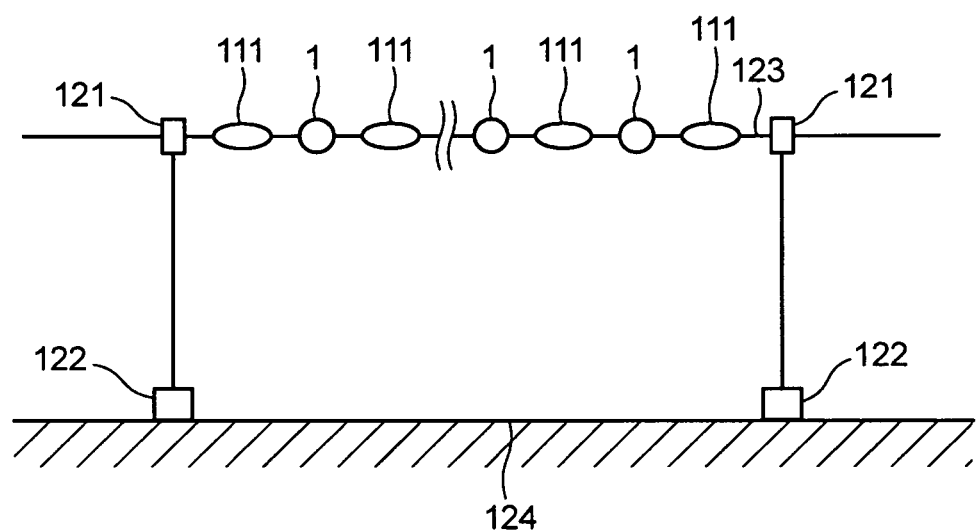
FIG. 17 depicts an example of the apparatus for producing, moving and climbing a mass of water vapor, including the water film makers and the heaters.

FIG. 17 depicts an example of the apparatus for producing, moving and climbing a mass of water vapor, including the water film makers and the heaters.

In FIG. 17, a plurality of the water film makers 1 and a plurality of the heaters 111 are located within a frame 121, and float on a water surface 123 within the frame 121. The frame 121 is tied to an anchor 122 fixed on a bottom 124 in order not to drift due to streams. When the water film makers 1 and the heaters 111 are intended to move to another area, they are released from the anchor 122, thereby the water film makers 1 and the heaters 111 can be moved together with the frame 121.

In order to prevent the water film makers 1 and the heaters 111 from drifting, they may be covered with a net, and further, be tied to an anchor.

In the arrangement set forth above, the water film makers 102 may be used in place of the water film makers 1, and the heaters 115 may be used in place of the heaters 111.

Figure 18:
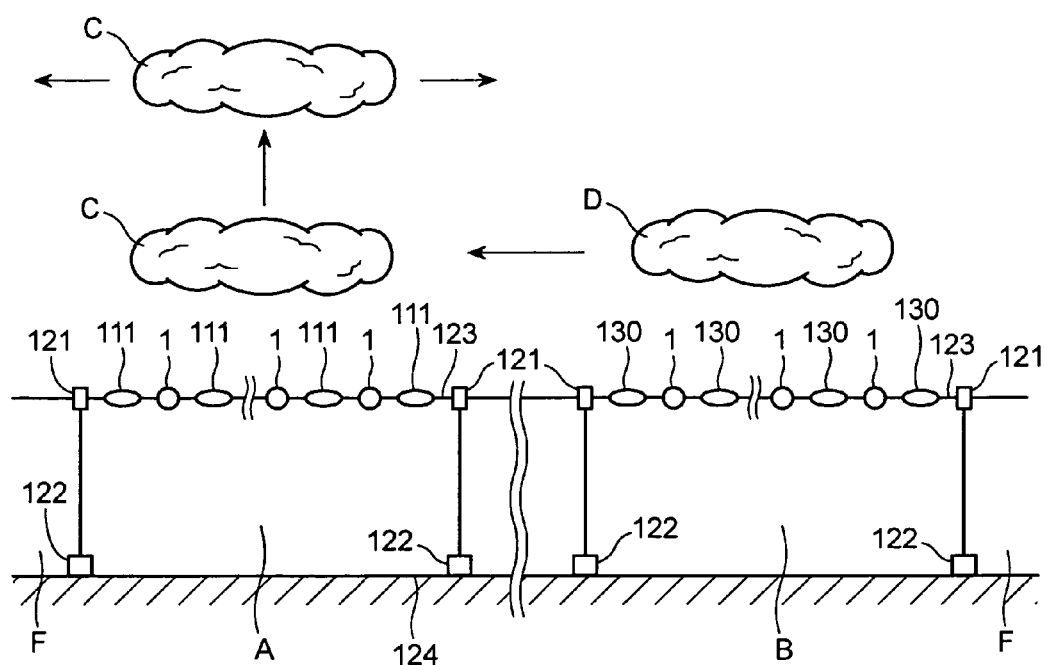
FIG. 18 depicts another example of the apparatus for producing, moving and climbing a mass of water vapor, including the water film makers and the heaters.

FIG. 18 depicts another example of the apparatus for producing, moving and climbing a mass of water vapor, including the water film makers and the heaters.

In FIG. 18, a plurality of the water film makers 1 and a plurality of the heaters 111 are located within a frame 121 in a sea area "A", and float on a water surface 123 within the frame 121, whereas a plurality of the water film makers 1 and a plurality of non-heaters 130 are located within the frame 121 in a sea area "B" remote from the sea area "A", and float on the water surface 123 within the frame 121. The frames 121 are tied to an anchor 122 fixed on a bottom 124 in order not to drift due to streams.

The non-heater 130 has the same structure as that of the heater 111 or 115 having been explained with reference to FIGS. 13 to 16, but is colored with a color having a high reflectance to sunlight. For instance, the non-heater 130 is covered with an aluminum foil, and hence, has a silver/white color like a mirror. Since a silver/white color mostly reflects sunlight to the sky like a mirror, sunlight energy is not converted to heat, and accordingly, atmospheric air around a sea area where the non-heaters 130 are arranged is not heated.

A mass of water vapor C produced above the sea area "A" is heated by the heaters 111, and thus, climbs in the sky, and then, horizontally moves after reaching at a maximum height. In a sea area "F" where the heaters 111 and the non-heaters 130 are not arranged, sea water is exposed to sunlight, and hence, is heated. Though a mass of water vapor D is produced above the sea area "B", the mass of water vapor D is not heated, because the non-heaters 130 are arranged on a water surface in the sea area "B". Atmospheric air existing above the sea area "B" has a lower temperature than that of atmospheric air existing above the sea areas "A" and "F". Thus, the mass of water vapor D does not climb in the sky, but flows into an area where atmospheric air is lowered after the mass of water vapor C climbed above the sea area "A". It is possible to produce air currents between the sea areas "A" and "B" in accordance with the above-mentioned mechanism. Since any areas may be defined as the sea areas "A" and "B", it is possible by the above-mentioned mechanism to move a mass of water vapor in a desired direction to thereby produce air currents, and hence, accomplish artificial stimulation of rain.

In the above-mentioned embodiment, when a mass of water vapor having been produced above the sea area "A" is intended to significantly climb, the heaters 111 are designed to be black in color, and have a maximum surface area for receiving sunlight. A color and/or an area of the heaters 111 may be determined in dependence on a height at which a mass of water vapor is intended to climb.

In the arrangement set forth above, the water film makers 102 may be used in place of the water film makers 1, and the heaters 115 may be used in place of the heaters 111.

In the explanation having been made so far, the water film maker 102, the heater 111, and the non-heater 130 are designed as separate parts independent from one another. As an alternative, one or more of the water film maker 102, the heater 111, and the non-heater 130 may be arranged on both upper and lower surfaces of a floater.

For instance, the water film maker 102 may be arranged on an upper surface of a floater, and the heater 111 may be arranged on a lower surface of the floater, in which case, by alternately arranging upper surfaces and lower surfaces of floaters on a water surface in the arrangement illustrated in FIG. 13, the arrangement illustrated in FIG. 13 is able to act as an apparatus for producing, moving and climbing a mass of water vapor. The heaters 115 may be used in place of the heaters 111 in the arrangement.

As an alternative, the heater 111 may be arranged on an upper surface of a floater, and the non-heater 130 may be arranged on a lower surface of the floater, in which case, by alternately arranging upper surfaces and lower surfaces of floaters on a water surface in the arrangement illustrated in FIG. 18, the arrangement illustrated in FIG. 18 is able to act as the heater 111 or the non-heater 130.

INDUSTRIAL APPLICABILITY

In accordance with the present invention, thin water films formed on a floater are exposed to sunlight, resulting in that a temperature of the thin water films increases with a high thermal efficiency up to a temperature at which water is vaporized, and thus, water existing in the thin water films is vaporized, and climbs in the sky, and then, forms a mass of water vapor having a high humidity. The mass of water vapor moves to a sky above a land such as a desert, and is cooled into raindrops because of temperature reduction at late afternoon because sunlight energy is reduced, or temperature reduction at night after sundown. As a result, it rains, that is, the raindrops fall to the earth. Thus, it is possible to accomplish artificial stimulation of rain comprised of plain water at a greater amount and at lower costs than a conventional apparatus for turning sea water into plain water. Accordingly, it is possible to significantly enhance living environment and vegetation environment in a desert or an area where it hardly rains, and further, promote various industries in those areas such as agriculture, industry or service. Thus, the present invention presents quite significant industrial applicability.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications Nos. 2008-071406 filed on Mar. 19, 2008 and 2008-158395 filed on Jun. 17, 2008 including specification, claims, drawings and summary is incorporated herein by reference in its entirety.

The invention claimed is:

1. An apparatus for producing a mass of water vapor, the apparatus comprising:

a water film maker floating on a surface of a water source, said water film maker absorbing water of the water source by virtue of a capillary mechanism or a moisture-holding ability to make a thin water film on a surface of the water film maker, the thin water film being exposed to sunlight, and the water film maker having a black surface to absorb sunlight energy and vaporize water in the thin water film; and a device which prevents the water film maker from drifting on the surface of the water source, wherein said water film maker comprises a first hollow body capable of being filled with air, and a sheet having said capillary mechanism or having said moisture-holding ability, said sheet covering said first hollow body, and wherein water in the thin water film is vaporized by sunlight energy to thereby produce a mass of water vapor in the sky.

2. The apparatus as set forth in claim 1, wherein said water film maker causes said sheet at opposite ends thereof to situate below the surface of the water source to absorb water into a portion of said sheet located above the surface of the water source by virtue of said capillary mechanism or said moisture-holding ability, and causes water in the thin water film to evaporate.

3. The apparatus as set forth in claim 1, wherein said apparatus includes a plurality of said first hollow bodies, each of said first hollow bodies having an opening through which air enters or is exhausted.

4. An apparatus for producing, moving and lifting a mass of water vapor, the apparatus comprising:
- an apparatus for producing a mass of water vapor; and
- an apparatus for heating atmospheric air and being arranged around said apparatus for producing the mass of water vapor,
- wherein said apparatus for producing the mass of water vapor includes:
- (i) a water film maker floating on a surface of a water source, said water film maker absorbing water of the water source by virtue of a capillary mechanism or a moisture-holding ability to make a thin water film on a surface of the water film maker, the thin water film being exposed to sunlight; and
- (ii) a device which prevents the water film maker from drifting on the surface of the water source,
- wherein said water film maker comprises a first hollow body capable of being filled with air, and a sheet presenting said capillary mechanism or having said moisture-holding ability, said sheet covering said first hollow body,
- wherein water in the thin water film is vaporized by sunlight energy to thereby produce a mass of water vapor in the sky,
- wherein said apparatus for heating atmospheric air includes a plurality of heaters each having a colored surface, and
- wherein said apparatus for heating atmospheric air controls an absorption rate at which said heaters absorb sunlight energy when exposed to sunlight to thereby control both a direction in which atmospheric air including the mass of water vapor produced by said apparatus for producing the mass of water vapor moves and a height to which said atmospheric air climbs.

5. The apparatus as set forth in claim 4, wherein each of said heaters comprises a second hollow body capable of being filled with air.

6. The apparatus as set forth in claim 5, wherein said second hollow body has a heat insulator on a surface thereof, said heat insulator being colored.

7. The apparatus as set forth in claim 5, wherein said apparatus includes a plurality of said second hollow bodies, each of said second hollow bodies having an opening through which air enters or is exhausted, and each of said second hollow bodies being colored.

8. The apparatus as set forth in claim 4, wherein a plurality of said water film makers and said heaters are arranged in a predetermined area, and a plurality of said water film makers and a plurality of non-heaters are arranged in an area other than the predetermined area.

9. A method of causing artificial stimulation of rain, the method comprising:
- causing a water film maker to absorb water of a water source by virtue of a capillary mechanism or a moisture-holding ability to make a thin water film on a water surface, the water film maker including a black surface and a first hollow body capable of being filled with air, and a sheet presenting the capillary mechanism or the moisture-holding ability, the sheet covering the first hollow body;
- producing a mass of water vapor in the sky by exposing the thin water film and the black surface to sunlight to absorb sunlight energy with the black surface and cause water in the thin water film to be vaporized by sunlight energy; and
- lifting atmospheric air including the mass of water vapor to thereby make artificial raindrops.

10. The apparatus as set forth in claim 4, wherein said water film maker causes said sheet at opposite ends thereof to situate below the surface of said water source to absorb water into a portion of said sheet located above the surface of the water source by virtue of said capillary mechanism or said moisture-holding ability, and causes water in the thin water film to evaporate.

11. The apparatus as set forth in claim 4, wherein said apparatus includes a plurality of said first hollow bodies, each of said first hollow bodies having an opening through which air enters or is exhausted.

12. The apparatus as set forth in claim 6, wherein said apparatus includes a plurality of said second hollow bodies, each of said second hollow bodies having an opening through which air enters or is exhausted, and each of said second hollow bodies being colored.

13. The apparatus as set forth in claim 5, wherein a plurality of said water film makers and said heaters are arranged in a predetermined area, and a plurality of said water film makers and a plurality of non-heaters are arranged in an area other than the predetermined area.

14. The apparatus as set forth in claim 6, wherein a plurality of said water film makers and said heaters are arranged in a predetermined area, and a plurality of said water film makers and a plurality of non-heaters are arranged in an area other than the predetermined area.

15. The apparatus as set forth in claim 7, wherein a plurality of said water film makers and said heaters are arranged in a predetermined area, and a plurality of said water film makers and a plurality of non-heaters are arranged in an area other than the predetermined area.

16. The method as set forth in claim 9, further comprising:
- providing a plurality of heaters each having a colored surface; and
- controlling an absorption rate at which the heaters absorb sunlight energy when exposed to sunlight to thereby control both a direction in which the atmospheric air moves and a height to which said atmospheric air climbs.

17. The method as set forth in claim 9, further comprising:
- providing an apparatus for producing a mass of water vapor, the apparatus including:
- (i) the water film maker floating on a surface of a water source, the water film maker absorbing water of the water source by virtue of the capillary mechanism or the moisture-holding ability to make a thin water film on a surface of the water film maker, the thin water film being exposed to sunlight; and
- (ii) a device which prevents the water film maker from drifting on the surface of the water source,
- wherein the water film maker comprises a first hollow body capable of being filled with air, and a sheet having the capillary mechanism or having the moisture-holding ability, the sheet covering the first hollow body, and
- wherein water in the thin water film is vaporized by sunlight energy to thereby produce a mass of water vapor in the sky.

18. The method as set forth in claim 17, wherein said device includes a frame and an anchor.

19. The apparatus as set forth in claim 1, wherein said device includes a frame and an anchor.

* * * * *